United States Patent [19]
Rinehart

[11] 4,432,919
[45] Feb. 21, 1984

[54] METHOD OF MAKING A COMPOSITE FOAM TAXIDERMY MANNIKIN

[76] Inventor: John R. Rinehart, 3232 McCormick Dr., Janesville, Wis. 53545

[21] Appl. No.: 363,263

[22] Filed: Mar. 29, 1982

[51] Int. Cl.³ .............................................. B29D 27/00
[52] U.S. Cl. .................................. 264/46.4; 264/46.9; 264/271.1; 264/275
[58] Field of Search .................... 264/46.9, 46.4, 45.7, 264/310, 271.1, 275

[56] References Cited
U.S. PATENT DOCUMENTS 3,106,040 10/1963 Ostrander ........................ 264/310 X
3,112,163 11/1963 Alderfer ............................. 264/46.4
3,432,581 3/1969 Rosen .............................. 264/45.7 X
4,288,903 9/1981 Matsuda et al. ................ 264/46.4 X Primary Examiner—Philip E. Anderson
Attorney, Agent, or Firm—Isaksen, Lathrop, Esch, Hart & Clark

[57] ABSTRACT

Disclosed is a taxidermy mannikin mold and molding method for making a mannikin which has eyes insert-molded therein in proper position and rotational orientation and which has proper eye-surrounding anatomical surface features. The mold cavity has therein eye socket recesses each of which is immediately surrounded by a correctly contoured surface having reference indicia marking.

6 Claims, 8 Drawing Figures

METHOD OF MAKING A COMPOSITE FOAM TAXIDERMY MANNIKIN

BACKGROUND OF THE INVENTION

Taxidermists mount animal head skins over molded animal head mannikins, such as deer head mannikins, and secure the result to a wall plaque or the like for use as a trophy.

Currently, these molded mannikins, usually of light-weight polyurethane foam material, do not have artificial eyes attached thereto. These mannikins have very large eye socket cavities into each of which the taxidermist must: mount centrally therein the artificial eye; make and mount eye-surrounding anatomy contour features, usually of modeling clay; and, if the eye is of the elongated pupil type, such as with deer, rotate the eye to a proper orientation for correct and natural appearance. The positioning and securing of the eye in correct position, and the forming of the correct eye-surrounding anatomical contour features, is demanding of considerable time and skill.

This invention provides a molding method for making a molded animal head mannikin which has the eyes insert-molded therein in correct position and rotational orientation and has correct eye-surrounding anatomy features, all as an integral part of the molded mannikin.

SUMMARY OF THE INVENTION

A summary description is set forth in the Abstract of the Disclosure and reference is to be had thereto.

An object of the invention is to provide a molding method for producing taxidermy animal head mannikins with the eyes and the eye-surrounding anatomy as part of the mannikin when it comes out of the mold, so that the taxidermist need not spend time and skill positioning or mounting the eyes, or filling in and contouring around the eyes to provide correct anatomical eye-surrounding features.

DETAILED DESCRIPTION OF THE SHOWN EMBODIMENT

Figure 1:
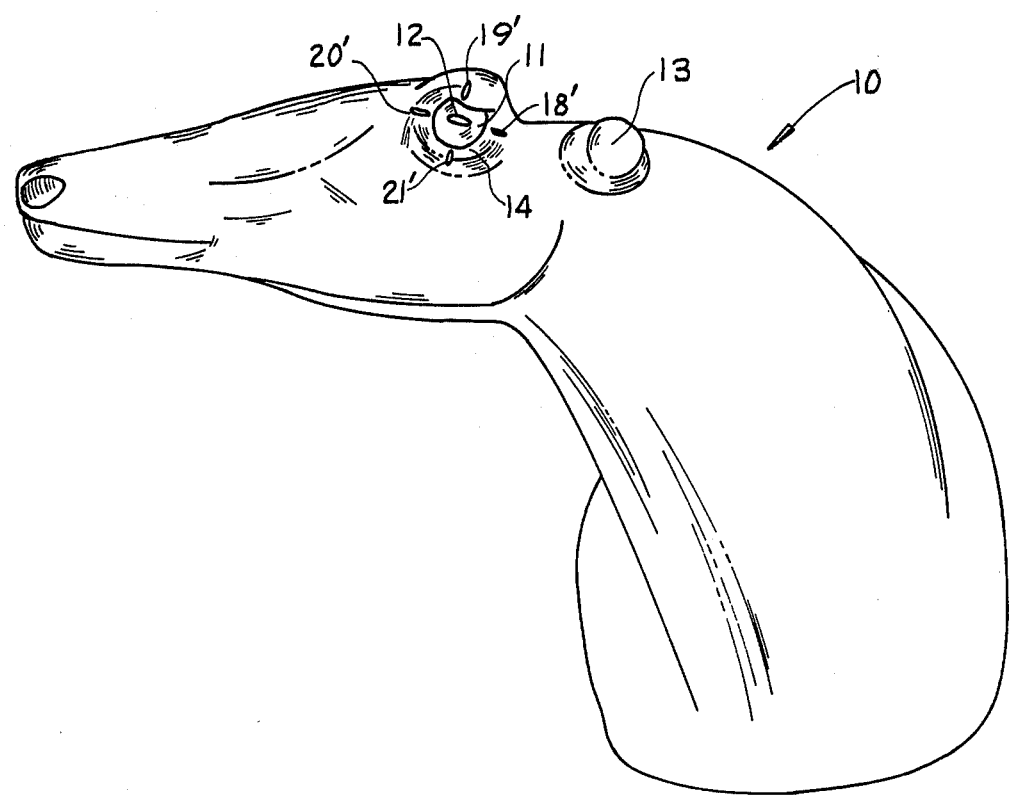
FIG. 1 is a view of a mannikin made in accordance with the invention.

Referring to the drawing, in FIG. 1 there is shown a deer head mannikin 10 molded in accordance with this invention of light-weight polyurethane foam material, having insert-molded therein an artificial eye 11 which has an elongated pupil 12. The mannikin has correct deer head anatomical features including the ear stump indicated at 13 and the eye-surrounding features indicated at 14.

Figure 2:
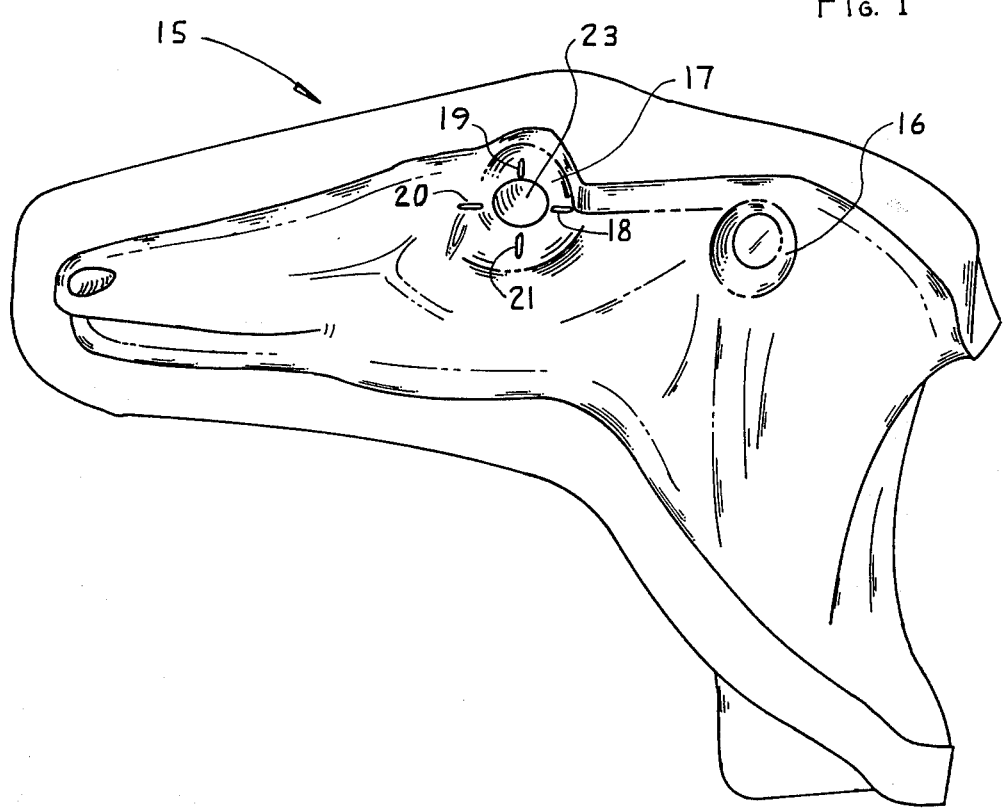
FIG. 2 is a view of the inside of one of the half parts of a mold made in accordance with the invention.
Figure 3:
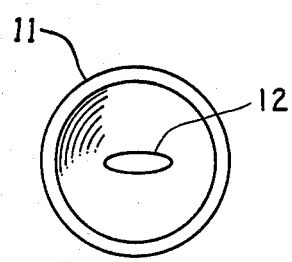
FIG. 3 is a rear elevation view of an artificial eye used in carrying out the invention.
Figure 4:
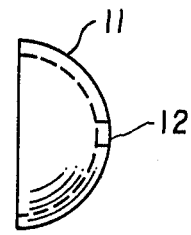
FIG. 4 is a side elevation view of the eye.
Figure 5:
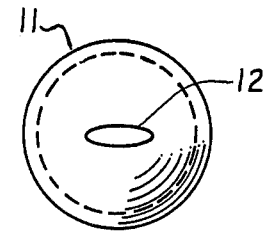
FIG. 5 is a front elevation view thereof.
Figure 6:
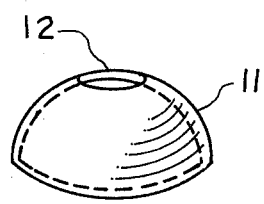
FIG. 6 is a perspective view thereof.

In FIG. 2 there is shown the right side half part 15 of a mold for forming the mannikin 10, the part 15 having an ear stump recess 16 in the cavity surface thereof and a semi-spherical eye socket recess 23 in said surface. The cavity surface is contoured to correctly form all features of the mannikin including the features immediately surrounding the eye, and, accordingly, the cavity surface is so contoured as indicated at 17 in FIG. 2 to provide the correct features indicated as 14 in FIG. 1. In the eye socket surrounding area 17 of the mold part there are ridges 18, 19, 20 and 21 which serve as indicia markings to facilitate properly positioning the eye in the eye socket recess. These ridges 18, 19, 20 and 21 produce, in the molding process, grooves 18', 19', 20' and 21' on the mannikin as shown in FIG. 1.

FIGS. 3, 4, 5 and 6 show an artificial deer eye 11 having an elongated pupil 12. The eye is of glass or plastic and is a semi-spherical shell having its concavity in the rear side thereof.

Figure 7:
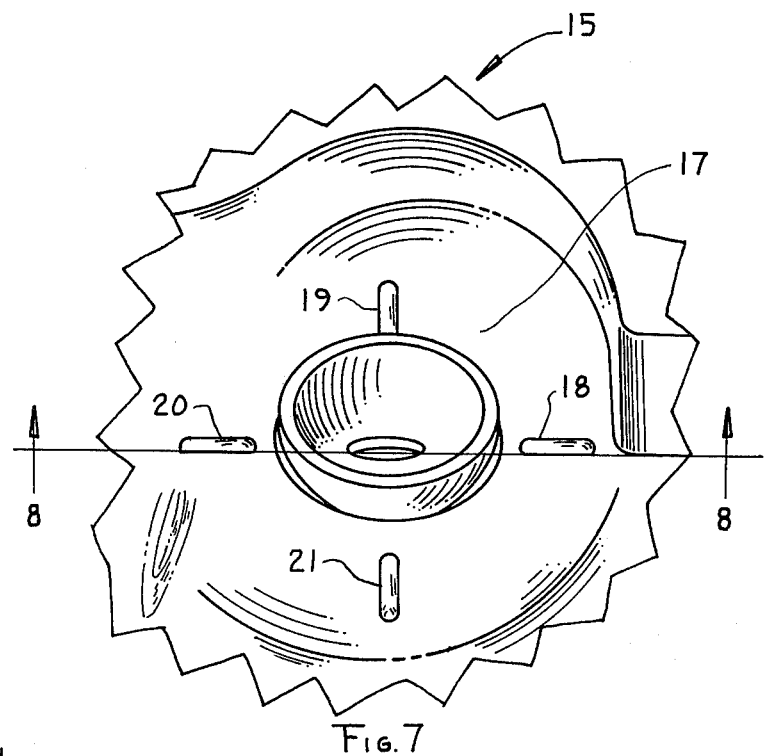
FIG. 7 is an enlarged view of a portion of the mold shown in FIG. 2, but showing the artificial eye inserted therein in proper position.

FIG. 7 shows an eye placed in the eye socket recess, in proper rotational orientation, with the elongated pupil's long axis aligned with ridges 18 and 20. The ridges 18, 19, 20 and 21 are shown equidistantly spaced about the perimetrical edge of the eye socket recess, with ridges 18 and 20 aligned with the long axis of the elongated pupil of the eye, and ridges 19 and 21 aligned with the short axis of that pupil.

Figure 8:
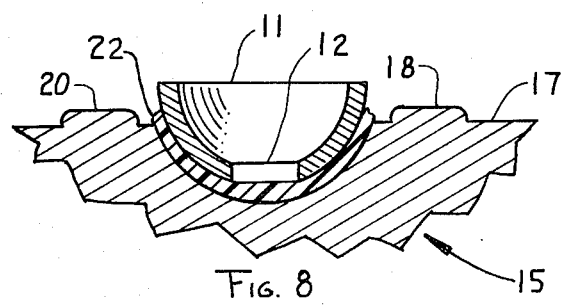
FIG. 8 is a section view taken on line 8—8 of FIG. 7.

FIG. 8 shows eye 11 inserted into the eye socket recess with eye 11 rotationally oriented so that elongated pupil 12 is aligned with ridges 18 and 20, and with eye 11 held in the recess by an adhesive 22, which adhesive may be removed from the front of the eye after removing the molded mannikin from the mold.

It will be appreciated that the invention is carried out by providing in each of two half mold cavity parts a small eye socket recess to snugly receive the front portion of the artificial eye, leaving the rear portion thereof projecting into the mold cavity, and by providing in each mold cavity part a correct sculpted or contoured surface of anatomical features immediately around the small eye socket recess right up to the edge thereof, and by providing, in that eye socket recess surrounding area, reference indicia marking to facilitate correct rotational positioning of the eye in the eye socket recess for correct directional orientation of the long axis of the elongated pupil of the eye. When inserting the eye into the eye socket recess and rotationally positioning it therein, one may use a removable (cleanable) adhesive which will hold the eye correctly during the molding operation, and which will be removable (cleanable) from the front of the eye after the molding operation. With eyes inserted into, properly positioned and held in each of the half mold parts, the half parts are then closed together to form the full mold; and the mannikin is then molded by pouring into the mold cavity a liquid polyurethane foaming material, allowing it to foam expand and harden. The material surrounds the rear portion of the eyes and enters the concavities thereof so as to lock the eyes securely in the mannikin. When the two half parts of the mold are separated, the resulting mannikin coming out of the mold has the eyes properly positioned in all respects, rotationally and otherwise, and has correct eye-surrounding anatomical features.

The taxidermist using mannikins produced in accordance with this invention may proceed to mount the animal skin over the mannikin, mounting the skin over the properly contoured surface including the eye-surrounding area right up to the perimeter of the eye itself. The taxidermist need not do anything to position the eye, and need not build up eye-surrounding surface to properly back up the skin.

What is claimed is:

1. The method of making a taxidermy animal head mannikin having elongated pupil artificial eyes properly positioned thereon and surrounded immediately by proper anatomical features, comprising:

providing a mold comprising a pair of mirror-image left and right half parts, each of which has a cavity surface contoured for correct anatomical formation of all features of half of the mannikin including the features immediately surrounding the eye; a semi-spherical eye socket recess in the cavity surface for snugly receiving the front portion of the eye; and reference indicia on the cavity surface near the edge of the eye socket recess including at least two indicia markings on opposite sides of the eye socket recess;

inserting into the eye socket recess of each half part of the mold the front portion of an eye leaving the rear portion thereof projecting into the mold cavity;

rotating the eye into proper position by orienting the elongated pupil with respect to the reference indicia such that the long axis of the elongated eye pupil is aligned with the two indicia markings;

closing the left and right half parts together to form the full mold cavity therebetween; and introducing liquid foamable hardenable material into the mold cavity to foam expand and harden, thereby forming the mannikin and locking the eyes into the mannikin in proper position therein.

2. The method of claim 1 including, after the step of rotating the eye into proper position, the step of securing the eye in the proper position.

3. The method of claim 1 wherein the step of introducing liquid foamable hardenable material comprises pouring the material into the mold cavity.

4. A method of making a taxidermy animal head mannikin having elongated pupil artificial eyes properly positioned thereon and surrounded immediately by proper anatomical features, comprising:

providing a mold comprising half parts which together define a cavity surface contoured for correct anatomical formation of all features of the mannikin including the features immediately surrounding the eye; two semi-spherical eye socket recesses in the cavity surface for snugly receiving the front portion of the eyes; and reference indicia ridges on the cavity surface near the edges of the eye socket recesses;

inserting into each eye socket recess of the mold the front portion of an eye with cleanable adhesive between the socket recess and the front portion of the eye, leaving the rear portion of the eye projecting into the mold cavity;

orienting the elongated pupil of each eye with respect to the reference indicia ridges;

closing the half parts together to form the full mold cavity therebetween; and introducing liquid foamable hardenable material into the mold cavity to foam expand and harden, thereby forming the mannikin and locking the eyes into the mannikin in proper position therein.

5. The method of claim 4 including the steps of:

separating the two half parts of the mold from the formed mannikin; and cleaning the adhesive from the eyes embedded in the mannikin.

6. The method of claim 4 wherein four reference indicia ridges are equally spaced about each eye socket recess.

* * * * *